United States Patent
Appanna et al.

(10) Patent No.: US 6,678,244 B1
(45) Date of Patent: Jan. 13, 2004

(54) CONGESTION MANAGEMENT SYSTEM AND METHOD

(75) Inventors: Chandrashekhar Appanna, Santa Clara, CA (US); Claude Cartee, Los Altos, CA (US); Frederick Baker, Santa Barbara, CA (US); Kenneth Moberg, Boulder Creek, CA (US); Andrew Valencia, Vashon, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/478,969

(22) Filed: Jan. 6, 2000

(51) Int. Cl.⁷ ............................ G01R 31/08; H04L 12/28
(52) U.S. Cl. ........................ 370/229; 370/400; 370/408; 370/412
(58) Field of Search .................................. 370/229, 230, 370/230.1, 231, 232, 233, 234, 235, 236, 394, 412, 414, 417, 428, 429, 401, 408, 392, 252, 255; 709/232, 233, 240, 242, 247, 318; 714/748; 713/190, 153; 710/52, 57, 100, 320

(56) References Cited

U.S. PATENT DOCUMENTS

| | | | | |
|---|---|---|---|---|
| 5,115,429 A | * | 5/1992 | Hluchyj et al. | 370/231 |
| 5,313,454 A | * | 5/1994 | Bustini et al. | 370/231 |
| 5,406,556 A | * | 4/1995 | Widjaja et al. | 370/381 |
| 5,426,640 A | * | 6/1995 | Hluchyj et al. | 370/235 |
| 5,638,359 A | | 6/1997 | Peltola et al. | 370/229 |
| 5,822,300 A | | 10/1998 | Johnson et al. | 370/229 |
| 6,463,035 B1 | * | 10/2002 | Moore | 370/236 |

* cited by examiner

Primary Examiner—Duc Ho
(74) Attorney, Agent, or Firm—Ritter, Lang & Kaplan LLP

(57) ABSTRACT

A method of monitoring congestion within a data path having a queuing node located therein and a plurality of downstream nodes positioned downstream of the queuing node. The method includes monitoring congestion at the plurality of downstream nodes and setting a congestion notification flag by one of the downstream nodes when the node is congested. The transmission of data packets from the queuing node is stopped and packets received at the queuing node are queued when the flag is set. The method further includes transmitting packets from the queuing node when the congestion notification flag is cleared. A system for monitoring congestion on a data path is also disclosed.

25 Claims, 4 Drawing Sheets

CONGESTION MANAGEMENT SYSTEM AND METHOD

BACKGROUND OF THE INVENTION

The present invention relates generally to congestion management in computer networks, and more particularly, to a congestion management system which utilizes downstream congestion notification.

A network is generally a data communication system which links two or more computers and peripheral devices to allow a user on a computer to access resources and exchange messages with users on other computers. Internetworking is the process of establishing and maintaining communications between and transferring data among multiple local networks in a distributed network system. The network allows users to share resources on their own systems with other network users and to access information on centrally located systems or on systems which are located at remote offices.

Networks transfer vast quantities of information in both local and wide area networks. Networks comprised of high performance switching elements are important for the high-speed transport of information which may include text, voice, and video information. For example, the information may consist of signals (electronic or optical) representing digitized or digital voice, video, or data that is transferred between endpoints in the network. In order for information to be transmitted in the network, a communication path must be established within the network between a sender and a receiver of the information. The communication path may be established by packet switching, for example.

Once connections are established, the connections must be regulated to prevent congestion in the network. When too many packets are present within a portion of the network, performance degrades due to congestion. As traffic increases above the load capacity of the network, routers and system modules are no longer able to support the traffic and they begin to queue and then lose packets. A quality of service (QOS) of a connection is provided by the network if the connection stays within specified traffic parameters such as the rate at which data bits are transmitted through the network and the variations in bit rate. Different classes of traffic may require different levels of QOS and have different traffic parameters.

Congestion may be brought about by several factors. If streams of packets suddenly begin arriving on three or four input lines and all need the same output line, a queue will build up. If there is insufficient memory to hold all of the packets, some packets will be lost. Adding more memory may help up to a point, but if routers have a large amount of memory, congestion may get worse, because by the time packets get to the front of the queue, they have already timed out and duplicate packets have been sent. Slow processors may also cause congestion. If the routers' Central Processing Units (CPUs) are slow at performing tasks (e.g., queuing buffers, updating tables), packets may build up within a queue, even though there is excess line capacity. Similarly, low-bandwidth lines can also cause congestion. Various measurements may be used to monitor network congestion such as the percentage of all packets discarded for lack of buffer space, average queue length, number of packets that time out and are retransmitted, average packet delay, and the standard deviation of packet delay, for example. Another approach is to have hosts or routers send probe packets out periodically to explicitly ask about congestion.

FIG. 1 illustrates a prior art method for identifying congestion within a communication path located in a network element. A number of software and hardware modules M are located within the communication path between a sender and a receiver. Packets $D_1$, $D_2$, $D_3$, $D_4$ have been sent in a stream along the communication path and are located at various positions along the path as indicated in a phantom box shown below the modules M in FIG. 1. One or more of the modules M may receive packets faster than it can dispose of them. As a result, the packets build up in a local buffered memory associated with the module, causing an overflow situation. When a module begins to receive packets faster than it can transmit the packets, it notifies the sender that the path is congested. The sender will hold the packets until the path is clear. As shown in FIG. 1, packets $D_1$, $D_2$, $D_3$, $D_4$ are held within the communication path which forms a distributed first in first out (FIFO) queue due to the delay in congestion notification. When the congestion is cleared, the packets $D_1$, $D_2$, $D_3$, $D_4$ held within the queue are sent along the path. One problem with this arrangement is that a high priority packet $D_0$ (e.g., voice over IP packet) contained within the sender's queue cannot be immediately sent through the communication path. Instead, it must wait until the other packets within the queue ($D_1$, $D_2$, $D_3$, $D_4$) are transmitted to the receiver. Furthermore, the sender cannot reorder packets within its queue to transmit a high priority packet since it does not know which packet will have the highest priority when the path is finally cleared and $D_0$ is received at the receiver.

There is, therefore, a need for a congestion management system that provides up to date congestion notification of all downstream modules to a queuing element within the communication path to prevent a buildup of packets within the path and allows for transmittal of high priority packets directly through the communication path once the path is cleared.

SUMMARY OF THE INVENTION

A congestion management system and method are disclosed. A method of the present invention is for monitoring congestion on a data path. The data path includes a queuing node located therein and a plurality of downstream nodes positioned downstream of the queuing node. The method generally includes monitoring congestion at the plurality of downstream nodes and setting a bit within a congestion notification flag by one of the downstream nodes when the node is congested. The transmission of data packets from the queuing node is then stopped and packets received at the queuing node are queued. Packets are transmitted from the queuing node when the congestion notification flag is cleared.

In another aspect of the invention, a system for managing congestion on a data path having a plurality of modules positioned therein generally comprises a queuing node positioned within the data path upstream of the modules and a downstream congestion notification device operable to receive input from the modules indicative of their congestion state and flag the queuing node when one of the modules is congested. The queuing node is operable to determine the state of the downstream congestion notification device prior to transmitting a packet and stop the transmission of packets therefrom and queue new packets received when the downstream congestion notification device indicates that one of the modules is congested.

A computer program product for monitoring congestion with the data communication path generally includes computer code that monitors congestion at the downstream nodes, computer code that sets a congestion notification flag when one of the downstream nodes is congested, and computer code that stops the transmission of data packets from the queuing node and queues packets received at the queuing node when the congestion notification flag is set. The product further includes computer code that transmits packets from the queuing node when the congestion notification flag is cleared and a computer readable medium that stores the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The congestion management system described herein may be implemented in the structure disclosed in the following embodiments and operates in conjunction with software based control procedures. However, it is contemplated that the control procedures may be embodied in another suitable media. As those skilled in the art will appreciate, a network configuration having end systems (i.e., sources and destinations) switches, links, and supporting hardware serves as a suitable hardware environment to implement the present invention.

Figure 1:
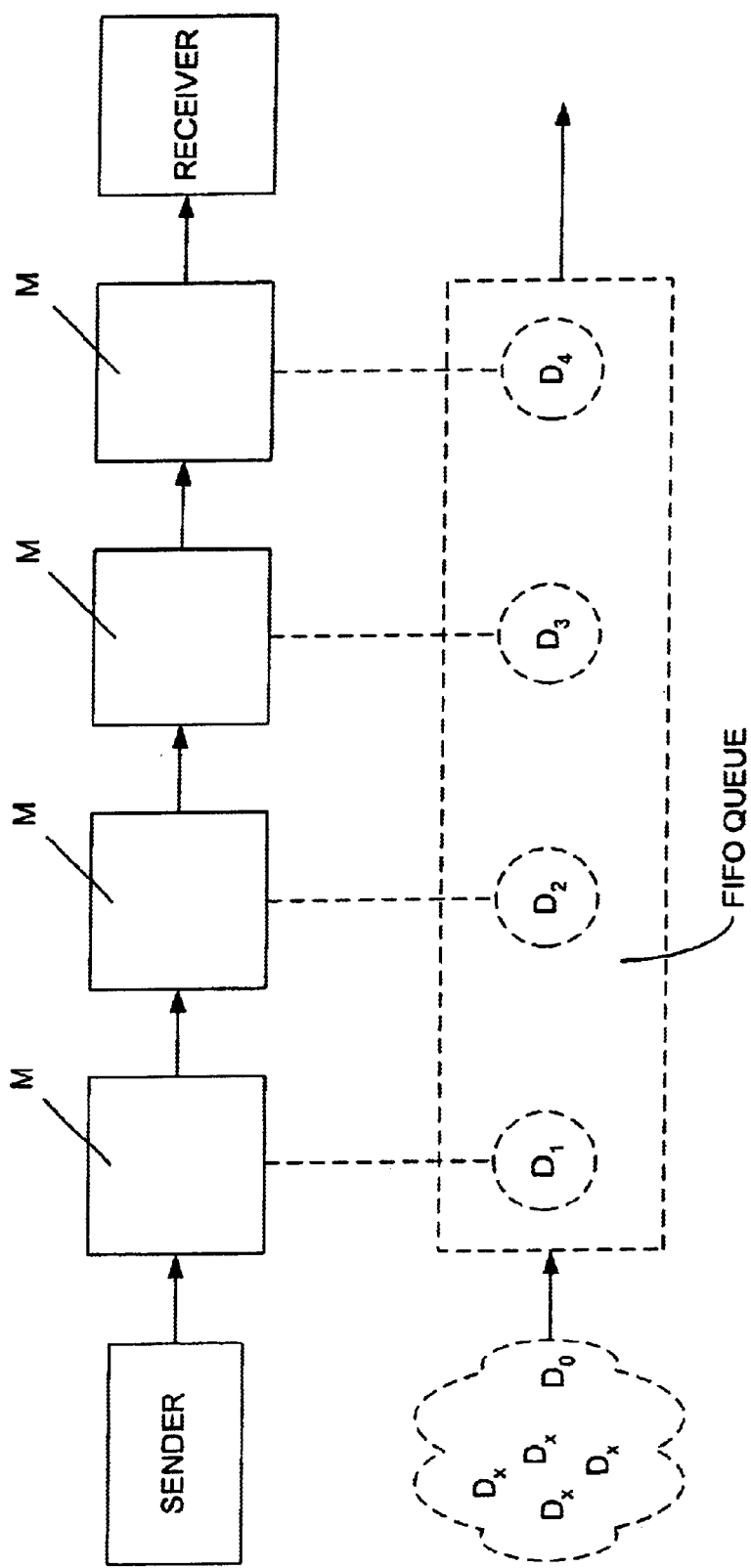
FIG. 1 is a schematic illustrating a prior art communication path within a networked device.
Figure 2:
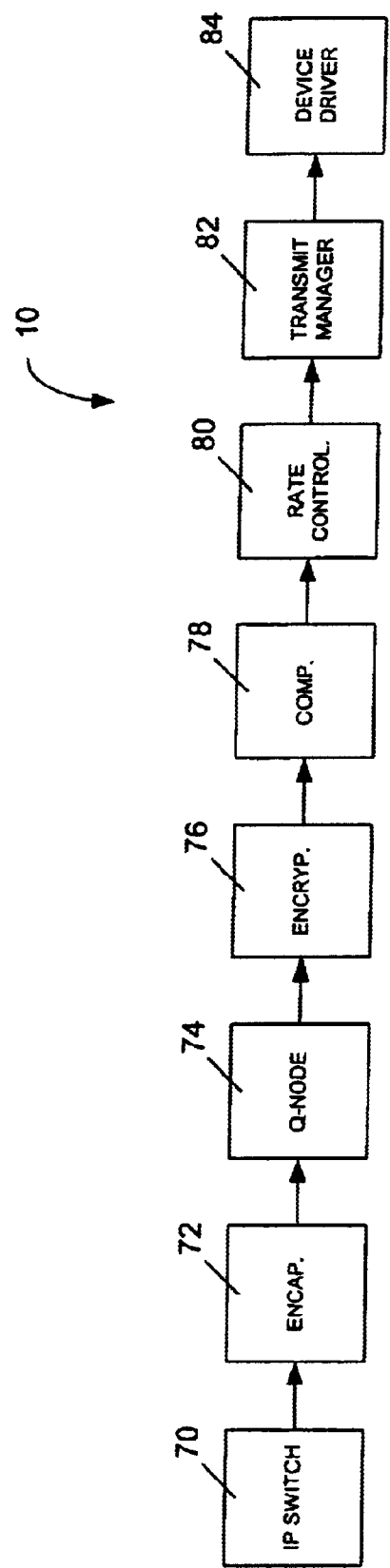
FIG. 2 is a schematic illustrating a communication path having a queuing node for use with a congestion management system of the present invention.

FIG. 2 is a block diagram of a data path 10 on which the congestion management system of the present invention may be utilized. The configuration management system is implemented at individual nodes (e.g., software or hardware modules) which are executed along an encapsulation or decapsulation chain, for example. The chains are used by a router to process packets, as described in U.S. patent application Ser. No. 09/418,723, entitled "Distributed Packet Processing Using Encapsulation and Decapsulation Chains", filed Oct. 15, 1999, which is incorporated herein by reference in its entirety. The decapsulation and encapsulation processes may include compression, encryption, and other functions which are broken down into individual elements and dynamically chained together using a chain linked structure. The various packet operations are logically separated into chain elements or nodes. The configuration management system distributes congestion information between entities which may generate congestion (e.g., rate controller) and those entities which require notification of congestion (e.g., queuing). The software code which supports the congestion management system may reside in protocols or media specific dynamic link libraries (DLLs). The configuration management software code is preferably executed on a per-packet basis so that congestion identification will occur on a per-packet basis.

Figure 3:
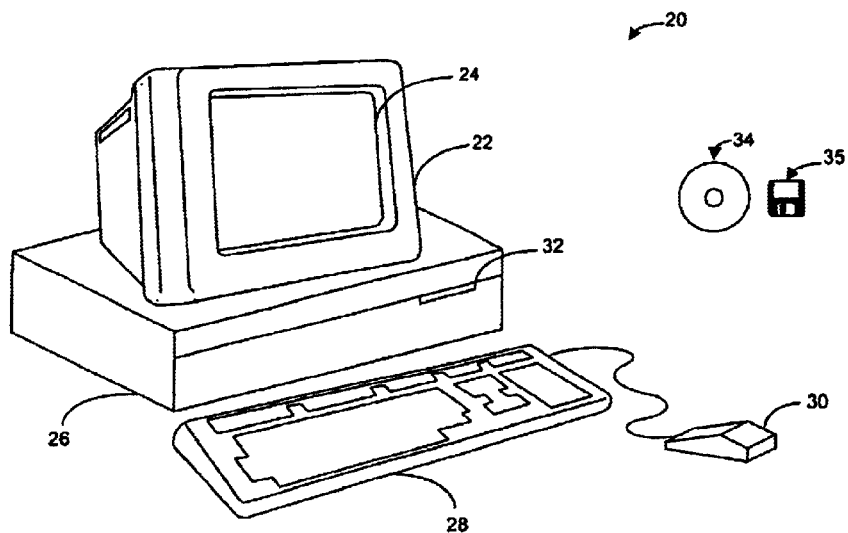
FIG. 3 is a schematic illustrating an example of a computer system that can be utilized to execute software of an embodiment of the invention.

FIG. 3 illustrates an example of a computer system that can be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and fixed storage 44 (see FIG. 4) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 4:
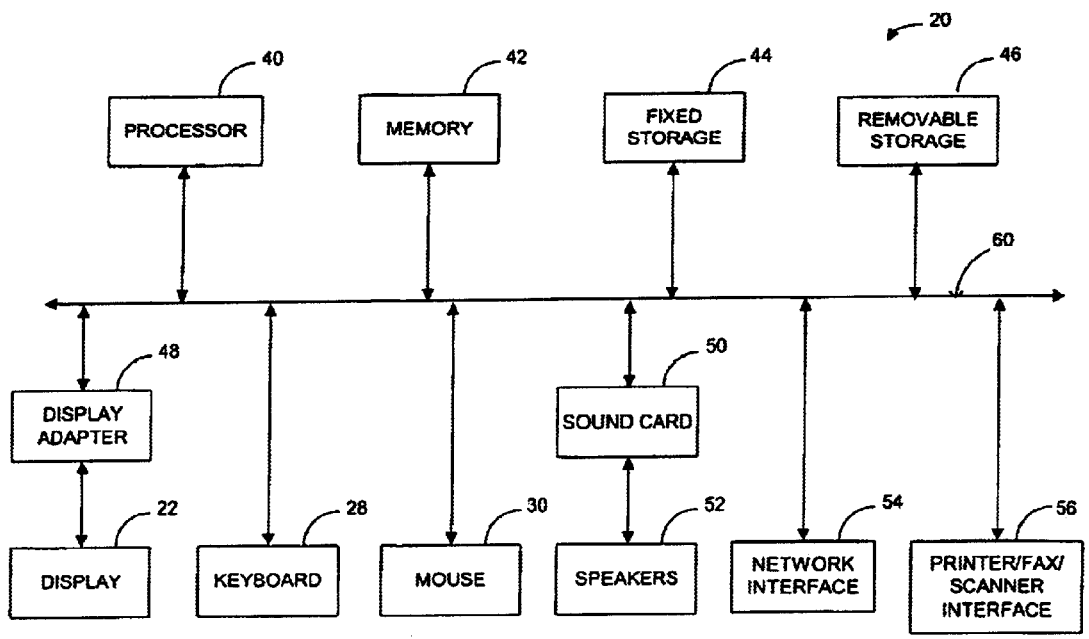
FIG. 4 is a system block diagram of the computer system of FIG. 3.

FIG. 4 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 4. However, these arrows are only illustrative of one possible interconnection scheme serving to link the subsystems. For example, a local bus could be utilized to connect the central processor 40 to the system memory 42 and display adapter 48. Computer system 20 shown in FIGS. 3 and 4 is but an example of a computer system suitable for use with the invention. Other computer architectures having different configurations or subsystems may also be utilized.

Referring again to FIG. 2, the data path includes an IP switch 70, encapsulation node 72, queuing node 74, encryption node 76, compression node 78, rate controller 80, transmit manager 82, and device driver 84. Each node includes a next field pointer which points to the next node in the chain, a previous field pointer which points to the previous node in the chain, a control processing pointer which points to the actual processing elements, a context pointer which points to context data that specifies operation of the node during chain walking and describes the state of a particular node, and a data processing pointer. A chain walker calls the function pointed to by the next pointer of the node and passes the context and packet to be processed. The chain is walked in order until control reaches the end of the chain or until a node queues or passes the packet. The chain walk typically starts with the first encapsulation node 72. Each node on the chain determines whether or not the chain walk continues based on its processing of the packet (see e.g., U.S. patent application Ser. No. 09/418,723, referenced above for additional detail on chain walking). The nodes required for congestion management are installed during the chain creation. An encapsulation processor insures proper placement of these nodes within the chain. For example, the encapsulation processor will place the Q-node 74 upstream of any nodes that cannot tolerate packet reordering (e.g., encryption compression nodes 76, 78).

The queuing node (Q-node) 74 is responsible for detecting downstream congestion (i.e., in a direction from the router out towards an interface connection) and storing packets until the congestion has subsided. The data path is configured such that there are no other queuing points beyond the designated Q-node 74 so that the path is free to receive new packets from the Q-node, as described below. The Q-node 74 may accept a packet at its input and either retain the packet or drop it a later point in time. It may also drop a packet at its input. The Q-node 74 is also operable to reorder the packets to send high priority packets first or reorder packets according to a policy defined by a flow identification node (not shown) located within the data path. The Q-node 74 is preferably responsible for determining which packet within its queue is the best to send or has the highest priority at a given time. There may also be a second best packet. During transmission of the best packet, other events such as packet arrivals or policy changes may occur that cause another packet to be deemed more important than the previously identified second best packet. Thus, the determination by the Q-node 74 of the best packet to send is constantly changing. The determination of which is the best packet to transmit is preferably delayed as long as possible so that the Q-node 74 has the most current information to make the optimum and most effective policy decision. In order to delay the decision, the Q-node 74 preferably has up to date information on the congestion state of all the downstream nodes so that it can send the packet as soon as the path is clear. If the Q-node 74 sends the best packet prematurely the packet may block the path and prevent the best packet from getting through at the appropriate time.

The nodes 76, 78, 80, 82 positioned downstream of the Q-node are referred to as downstream nodes (DSN). Downstream is defined relative to the data flow which is from the switching point 70 down towards the hardware 84. Nodes which cannot tolerate packet reordering or which must embed protocol data into a data stream may be downstream nodes. It is to be understood that the congestion management system may be used with chains having different configurations and nodes than described herein and may also be used within data paths that do not utilize chains, without departing from the scope of the invention.

Each downstream node 76, 78, 80, 82 notifies the Q-node 74 that it is congested by setting a bit equal to one in a downstream congestion notification flag (DSCNF). The DSCNF is used by the Q-node 74 and the downstream nodes 76, 78, 80, 82 to indicate and monitor congestion. The notification flag allows the Q-node 74 to have a single point of reference to understand the congestion state of the entire downstream path in a single data structure. The Q-node 74 checks the downstream congestion notification flag prior to processing packets destined for the output interface. If the flag indicates that the internal data path is not congested, the Q-node allows a packet stream to pass through with minimal delay, or emits a previously queued packet. If the notification flag indicates congestion, the packet is queued according to a predefined flow policy. The packets may be queued, for example, according to parameters set by a packet classification node (not shown) positioned upstream of the Q-node 74. If any one of the downstream nodes 76, 78, 80, 82 indicates congestion, the Q-node 74 will consider the path congested and queue packets as they are received. If the path is not congested, the node is free to process the packet, if required, and then send the packet along to the next node in the chain. Prior to passing the packet to the next node, the current node examines its own congestion state. If this packet or some other condition has resulted in congestion of the node, it sets its congestion bit to one. This will prevent further packets from being sent through this node.

The downstream congestion notification flag is preferably a multi-bit flag field with each downstream node having a single bit position indicating its congestion state. The congestion state is a binary state indicating whether a particular downstream node is able to accept the next packet. If the bit is clear, a packet can be accepted by the downstream node. If the bit is set, the downstream node is congested and is not able to accept any packets. Preferably, the downstream nodes are also able to read the downstream congestion notification flag. For example, the bit positions may be numbered in such a way as to allow nodes to query the congestion state of nodes positioned downstream of their own node.

The last bit position of the downstream congestion notification flag is preferably the transmit manager 82. The transmit manager 82 is responsible for metering out traffic to the device driver 84 and ensuring that only a limited number of bytes are outstanding in the driver's queue. The transmit manager 82 preferably maintains a count of outstanding bytes in the hardware transmit queue. Once this count reaches a predetermined upper limit, the transmit manager 82 will set its congestion notification flag which will stop any node from sending more packets down the path. Thus, when the path is congested, the transmit manager 82 will not transmit a packet to the device driver 84 if the driver is not able to take additional packets. If a packet cannot be queued at the driver 84 due to a full queue, it is queued in the transmit manager 82 and the congestion notification flag is set. If the transmit manager 82 hands a packet to the device driver 84 that is too large for the space left in the driver's queue (i.e., exceeds the current number of free particles within the driver), the device driver will reject the packet and the transmit manager will queue the packet internally and set the congestion notification flag. The transmit manager 82 will then operate as an overflow queue until enough free space is available in the driver's queue. Once the device driver 84 has transmitted a packet, it will issue a pull to the transmit manager 82 to indicate it is ready to receive more packets. The transmit manager 82 will then decide whether to deliver another packet if available, or to de-assert congestion and propagate a pull command to other upstream nodes.

When the path is not congested, a packet pull operation is initiated from the driver 84. The packet pull is a signal to the transmit manager 82 that the driver 84 or hardware adapter is ready to accept another packet. The packet pull operation begins at the driver 84 and proceeds upstream through each node that has indicated it should be inserted along the pull path. When the transmit manager 82 receives a pull from the driver 84 it pulls on the pull chain by calling a pull walker. The pull walker traverses the nodes via the previous pull field. At each node the pull walker will call a node en_pull function which takes as an argument the current node pointer. The en_pull function can perform the following operation:

a) Transmit packets if there are packets to transmit and no congestion is present;

b) Stop processing and return if there is congestion; or c) Propagate pull to next node in the pull chain if all packets are transmitted and no congestion is present Only nodes that require notification of the decongesting event are threaded using pull chain pointers. For example, the Q-node 74 is threaded on the pull chain since it queues packets. The rate controller node 80 does not queue but it does congest, so it would also be part of a pull chain. A node that does not congest or does not queue (e.g., a debug node) would not be part of the pull chain. When congestion is identified, a packet push operation results in queuing at the Q-node 74. Once the path becomes decongested, the decongesting entity will initiate a packet pull to start the flow of packets along the chain. The Q-node 74 will then convert the packet pull operation into a packet push operation.

Figure 5A:
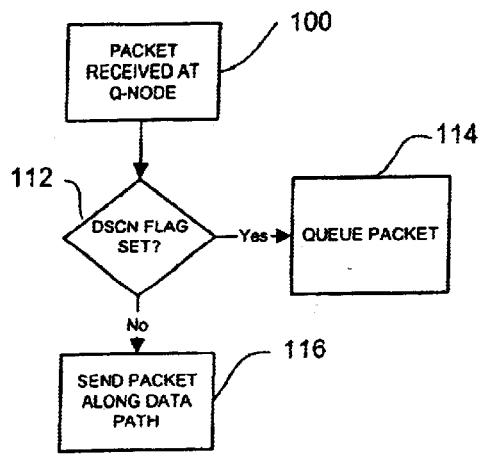
FIG. 5A is a flowchart illustrating a process for transmitting data packets received at a queuing node.
Figure 5B:
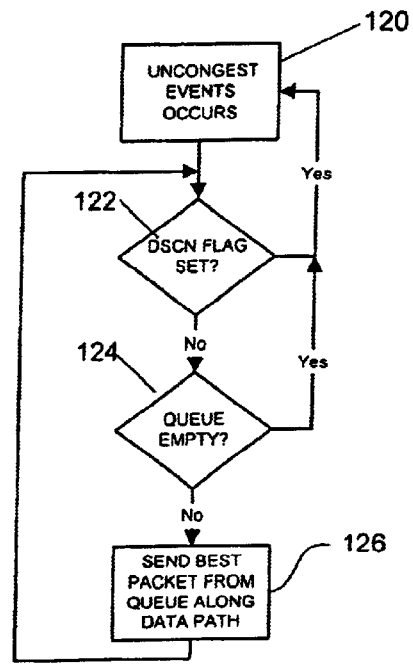
FIG. 5B is a flowchart illustrating a process at the queuing node when an uncongest event occurs.

FIGS. 5A–5D are flowcharts illustrating processes for monitoring congestion within the communication path of FIG. 2 and queuing packets when the path becomes congested. FIG. 5A illustrates Q-node operation when a packet is received (step 100). If the DSCN flag is not set the packet is sent along the data path 10 (steps 112 and 116). If the DSCN flag is set (step 112) the packet is queued at the Q-node 74 (step 114). FIG. 5B illustrates Q-node operation when an uncongest event occurs. When the path is congested, the Q-node waits for an uncongest event (step 120). When an uncongest event occurs and the DSCN flag is still set, the Q-node continues to wait for another uncongest event to occur (steps 120 and 122). If the DSCN flag is not set and there are packets in the queue, the Q-node will send the best packet along the data path (steps 122, 124 and 126).

Figure 5C:
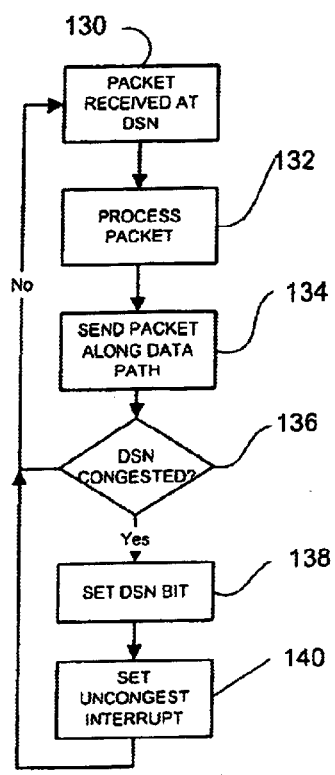
FIG. 5C is a flowchart illustrating a process for processing and transmitting packets at a downstream node.
Figure 5D:
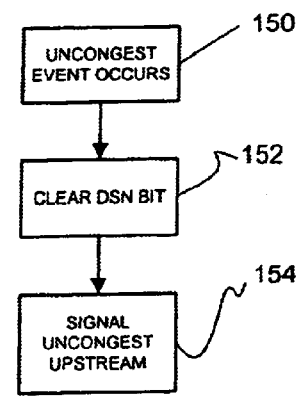
FIG. 5D is a flowchart illustrating a process at the downstream node when an uncongest event occurs.

FIG. 5C illustrates operation of a downstream node. When a packet is received at a downstream node, it is processed by the node and sent along the data path (steps 130, 132, and 134). If the downstream node is congested a DSN bit will be set in the DSCN flag and an uncongest interrupt will be set (steps 136, 138, and 140). If the downstream node is not congested, it will wait for another packet (steps 136 and 130). FIG. 5D shows a downstream node waiting for an uncongest event to occur (step 150). When an uncongest event occurs, the DSN bit is cleared and an uncongest signal is sent upstream (steps 152 and 154).

As can be observed from the foregoing, the congestion management system has many advantages. The system provides a method for reacting to downstream congestion and transmit resource availability. The system improves QOS by minimizing the latency between congestion notification and congestion management.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method of monitoring congestion on a data path having a queuing node located therein and a plurality of downstream nodes positioned downstream of the queuing node, the data path configured such that the queuing node is the only queuing point within the path so that the data path is free to receive new packets from the queuing node, the method comprising:

monitoring congestion at said plurality of downstream nodes;

receiving at the queuing node indication of a congestion notification flag set by one of the downstream nodes when said downstream node is congested;

stopping transmission of data packets from the queuing node and queuing packets received at the queuing node when the congestion notification flag is set; and transmitting packets from the queuing node when the congestion notification flag is cleared.

2. The method of claim 1 further comprising transferring a high priority packet to the front of a queue formed within the queuing node.

3. The method of claim 1 further comprising reordering packets contained within the queuing node.

4. The method of claim 1 wherein monitoring congestion comprises monitoring the downstream congestion notification flag by the queuing node.

5. The method of claim 4 wherein monitoring the downstream congestion notification flag comprises checking a state of the flag prior to transmitting a packet from the queuing node.

6. The method of claim 1 wherein said plurality of downstream nodes includes an encryption node and a compression node.

7. The method of claim 1 wherein said plurality of downstream nodes include a rate controller.

8. The method of claim 1 wherein transmitting packets from the queuing node comprises transmitting packets along the data path to a device driver.

9. A system for monitoring congestion on a data path having a plurality of modules positioned therein, the system comprising a queuing node positioned within the data path upstream of the modules, the data path configured such that the queuing node is the only queuing point within the path so the data path is free to receive new packets from the queuing node;

a downstream congestion notification device operable to receive input from the modules indicative of their congestion state and set a flag when one of the modules is congested;

wherein the queuing node is operable to determine the state of the downstream congestion notification flag prior to transmitting a packet and stop the transmission of packets therefrom and queue new packets received when the downstream congestion notification device indicates that one of the modules is congested.

10. The system of claim 9 wherein the queuing node is operable to reorder the packets held in its queue.

11. The system of claim 9 wherein said plurality of modules include software modules.

12. The system of claim 9 wherein one of said plurality of modules is, a hardware module.

13. The system of claim 9 wherein said plurality of modules includes encryption and compression modules.

14. A computer program product for monitoring congestion within a data communication path having a queuing node and a plurality of downstream nodes located downstream of the queuing node, the data path configured such that the queuing node is the only queuing point within the path so that the data path is free to receive new packets from the queuing node, the product comprising:

computer code that monitors congestion at said plurality of downstream nodes;

computer code that sets a congestion notification flag when one of the downstream nodes is congested;

computer code that stops the transmission of data packets from the queuing node and queues packets received at the queuing node when the congestion notification flag is set;

computer code that transmits packets from the queuing node when the congestion notification flag is cleared; and a computer readable medium that stores the computer codes.

15. The computer program product of claim 14 further comprising code that transfers a high priority packet to the front of a queue formed within the queuing node when the path is congested.

16. The computer program product of claim 14 further comprising code that reorders packets within the queuing node.

17. The computer program product of claim 14 wherein the computer readable medium is selected from the group consisting of CD-ROM, floppy disk, zip disk, tape, flash memory, system memory, hard drive, and data signal embodied in a carrier wave.

18. A method of monitoring congestion on a data path having a queuing node located therein and a plurality of downstream nodes positioned downstream of the queuing node, the data path configured such that the queuing node is the only point within the path so that the data is free to receive new packets from the queuing node, one of the downstream nodes within the data path configured to set a congestion notification flag when said downstream node is congested and transmit the congestion notification flag to the queuing node, the method comprising:

reading a congestion notification flag set by one of the downstream nodes when said downstream node is congested;

stopping transmission of data packets from the queuing node and queuing packets received at the queuing node when the congestion notification flag is set; and transmitting packets from the queuing node when the congestion notification flag is cleared.

19. The method of claim 18 further comprising reordering packets contained within the queuing node and wherein transmitting packets from the queuing node when the congestion notification flag is cleared comprises transmitting the reordered packets to the data path when the flag is cleared.

20. The method of claim 19 further comprising receiving the reordered packets at one of the downstream nodes and immediately transmitting the packets in the order received.

21. The method of claim 19 wherein reordering the packets comprises placing high priority packets at the front of the queue.

22. The method of claim 19 wherein reordering the packets comprises reordering the packets based on a policy defined by a flow identification node located within the data path.

23. The method of claim 18 further comprising checking a state of the flag at the downstream nodes prior to transmitting a packet from the queuing node.

24. The method of claim 18 wherein reading a congestion notification flag comprises reading a single bit in a downstream congestion notification flag.

25. The method of claim 18 further comprising reading the congestion notification flag of one of the downstream nodes at a different downstream node.

* * * * *